March 17, 1931. C. H. RAYNER Re. 18,001

METHOD OF PRODUCING INTERLININGS AND FILLER THEREFOR

Original Filed March 15, 1926

Inventor

C. H. Rayner,

By H. M. Brigham Attorney

Reissued Mar. 17, 1931 Re. 18,001

UNITED STATES PATENT OFFICE

CHARLES HANSON RAYNER, OF PITTSBURGH, PENNSYLVANIA, ASSIGNOR TO AMERICAN HAIR & FELT COMPANY, OF CHICAGO, ILLINOIS, A CORPORATION OF ILLINOIS

METHOD OF PRODUCING INTERLININGS AND FILLER THEREFOR

Original No. 1,726,680, dated September 3, 1929, Serial No. 94,811, filed March 15, 1926. Application for reissue filed June 3, 1930. Serial No. 459,081.

The invention relates to an interlining and filler therefor, and a method of producing the same, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to facilitate the insulation of walls, roofs, and flooring and maintain the atmospheric conditions of an enclosure suitable for its uses, such as the interlinings in passenger cars, freight cars, buildings, refrigerating plants and all chambers requiring protection from external weather conditions and to do this without interfering with a certain circulation of air as represented in the constant transference of air in globules within the filler of the composite sheets, and thereby avoid inertia in the actual lining material which is inherent in felts and pressed cloths, pulps and paper used as fillers; to eliminate the absorption and retention of moisture and hot or cold air; to produce a material at a low cost without reducing its efficiency or its usefulness; to insure great facility in the installation of the insulation in vehicles and buildings; to maintain even temperatures for the occupants of apartments, compartments or other chambers, to apply this invention to many and various uses other than at present; and generally to provide a durable and reliable insulation, which will bring forth excellent results in all applications and be economical with regard to its production.

In the drawings, Figure 1 is a cross sectional view of the insulation showing the filler and layers.

Like numerals of reference indicate corresponding parts in the various figures.

Figure 3:
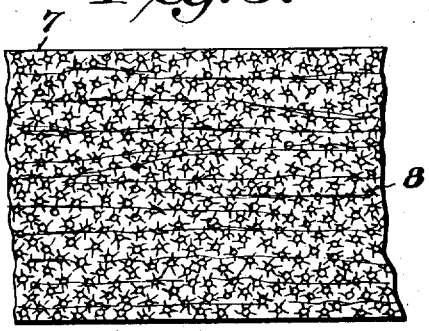
Figure 3 is a plan view of the backing and binding sheet showing the hairs or fibers locked therein.
Figure 6:
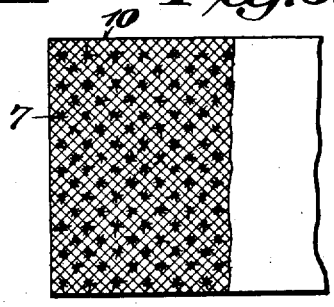
Figure 6 is a fragmentary plan view showing the use of gauze and felt as a binder sheet.
Figure 4:
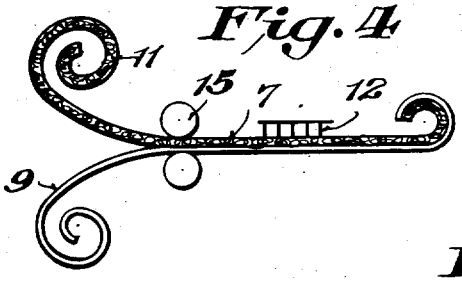
Figure 4 is a diagrammatic view showing the means for interlocking the hair and backing to form the filler.
Figure 5:
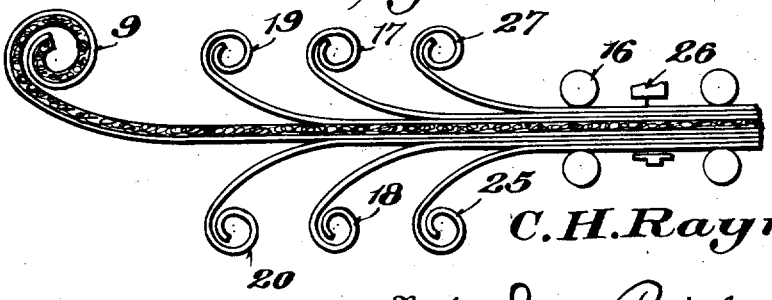
Figure 5 is a diagrammatic view showing the means for assembling the layers.

Referring to the drawings, the numeral 7 indicates the filler in both forms of the invention, which is made of loose hair and paper preferably crepe paper 8, as shown in Figure 3 or felt paper 9 reinforced by a textile fabric 10 as shown in Figure 6. In the crimped and crisped paper, commonly termed crepe paper in commerce, the expansion and contraction due to atmospheric conditions is fully provided for and in the reinforced felt paper the same advantage is gained.

Figure 1:
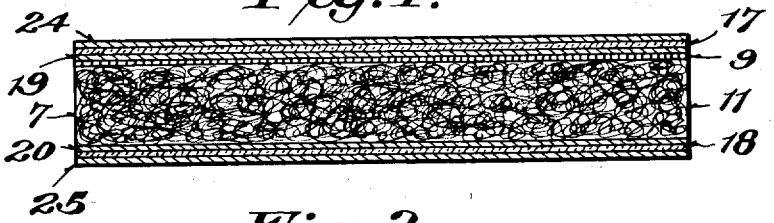
Figure 2:
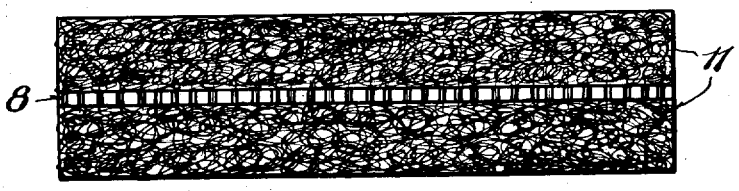
Figure 2 is a cross sectional view showing the hair on both sides of the backing and binding sheet.

The filler 7 is shown in Figures 1, 3, 4 and 5 as having a bat of loose hairy material 11 on the one side only, while in Figure 2 the bats of hair are shown on both sides of the crepe paper 8.

The bat is frequently made of animal hair, but it must be understood that there are many animal, vegetable and mineral fibers that may be used, and further there may be mixtures of the different fibres, according to the use that the filler is put to, the essential features being the comparative looseness of the bats to permit the collection of air globules and the firm adherence of the bat or bats to the ventilated binding sheet, notwithstanding the unpressed condition of the hair and its remoteness from the felt condition.

The method employed for securing and locking the hair bats to the paper is preferably by means of a loom having numerous needles with barb points indicated by the numeral 12, these points carrying strands of the hair through the paper to form the hair covering for the latter. The needles make innumerable holes in the paper, and in carrying the hair lengths with them interlock the hair and the paper, said needles clearing themselves on their backward or withdrawal strokes as the barbs are in the shape of flaring points.

The method is the same for attaching the loose hair to the two sides of the paper as shown the only difference being that of an extra step in the process.

The bat is prepared in any machine that will bring it together satisfactorily, such as beater or batter of conventional design and in this the hairs are assembled and extended and formed into a bat and delivered on a large cylindrical roll.

The bat in this condition is quite loose and the hairs simply cling to one another by capillary attraction and it is not pressed or felted. In this condition, it is passed into the machine 15, where it is punched by the barb points into the accompanying sheet of paper adapted to form a permanent binder.

The binding sheet and the hair come out of the machine 15 together and constitute the filler in any interlining required.

For wall interlining this filler is fed into the machine 16 with sheets of asbestos 17 and 18 and the insert paper sheets 19 and 20 from rolls conveniently spaced, as well as the gauze outer layers 24 and 25, the gauze 24 covering the asbestos paper 17 over the paper binding sheet and the gauze 25 covering the asbestos sheet 18 on the insert sheet and plain paper 20.

The composite sheet formed of the hair filler, the asbestos paper the plain paper and the gauze is cross stitched in the machine 26, which securely sews the outer gauze covering and the layers together, thereby providing a reliable sheet of interlining that can be rolled and shaped and installed with great facility.

In using this invention, take for example the interlining of passenger cars on railways, the sheets are secured in the wall of the car, between the outside sheeting and the inside sheeting, thereby insuring an effectual bar to the penetration of moisture or hot or cold air and while it has been known for many years to insert an interlining sheet between sheetings of walls, ceilings, floors and other places, it is not known so far as I am aware to construct and furnish an insulation having features such are described herein, and pointed out in the claims.

The adherence of comparatively loose hair to burlap by the method of inserting picks through the hair and burlap is already well known in this particular art, in fact it has been in use for some years, therefore to push the ends of hair through the woven material is not novel, but to push loose strands of hair through and coincidently ventilate a binding sheet of paper constitutes a novel idea and brings forth a new article as the punching by the barb points opens up the paper as well as interlocks the hair so that there are two purposes accomplished in this method, one of which is the formation and the aeration of the filler the other.

Further it may be said that the crimping and crisping of the paper, forming the binding sheet, produces a backing for the loose hair that meets all the conditions of insulation and particularly those regarding moisture and heat. It must be thoroughly understood that this invention is unique in the fact that it comes out of an art that has been fairly well taken up in earlier inventions and yet its essential features create an entirely new article, as well as provide efficiency in wall, floor and ceiling insulation.

It is also pointed out, as shown in Figure 3 of the drawings that the openings formed in otherwise imperforate carrier sheet are formed at irregularly spaced intervals thereby to avoid the tendency to produce shear lines in the paper which would interfere with the proper handling of the completed product. That is to say the spacings of the holes or openings formed in the sheet is not in any regular order, and the holes are placed approximately at proper distances apart to avoid the tearing of the paper either in the handling of the partially or wholly complete product.

Also the regular spacing of the holes as shown in Figure 3 of the drawings materially preserves the tensile strength of the paper.

What I claim is:

1. A step in a method of making an interlining filler comprising laying of the hairs on a stiff sheet of crepe paper having flattened crinkles, and punching many irregular holes through the paper for ventilation purposes, and carrying strands of hair through these holes at each and every punching operation.

2. A step in a method of making an interlining filler comprising laying a bat of loose hairs on a sheet of paper and punching many irregular holes through the paper and carrying strands of the hair through these holes at every punching operation to thereby interlace substantially all of the fibres with each other only to such an extent that the bat is self-sustaining independent of the paper and its cellular structure preserved.

3. A step in a method of making an interlining filler comprising laying a bat of loose fibres on a sheet of paper and punching many irregular holes through the paper to carry the fibres through the holes at every punching operation and interlacing substantially all of the fibres with each other only to such an extent that the bat is self-sustaining independent of the paper and its cellular structure preserved.

4. A step in a method of making a self-sustaining interlining filler comprising a supporting medium and a fibrous bat, which consists in subjecting a tangle of loose fibres to a degree of needling sufficient to interlace substantially all of the fibres to thereby render the filler self-sustaining independent of the supporting medium and without destroying the cellular structure.

In testimony whereof I hereunto affix my signature.

CHARLES HANSON RAYNER.